United States Patent [19]

Bendel

[11] 4,155,462

[45] May 22, 1979

[54] STORAGE RACKS FOR WAREHOUSES AND THE LIKE

[75] Inventor: Hans J. Bendel, Kuesnacht, Switzerland

[73] Assignee: Lansing Bagnall Limited, Hampshire, England

[21] Appl. No.: 866,170

[22] Filed: Dec. 30, 1977

[30] Foreign Application Priority Data

Jan. 7, 1977 [GB] United Kingdom ............... 617/77

[51] Int. Cl.² .............................................. A47F 5/00
[52] U.S. Cl. ................................... 211/151; 108/102; 108/136; 211/49 D; 211/191
[58] Field of Search .................... 108/54, 136, 102; 211/49 D, 151, 162, 191; 214/16.4 R; 312/71

[56] References Cited

U.S. PATENT DOCUMENTS

| 2,085,479 | 6/1937 | Shaffer et al. | 211/49 D |
| 3,028,014 | 4/1962 | Southwick | 211/49 D |
| 3,399,784 | 9/1968 | Buchbinder | 211/151 |

Primary Examiner—James C. Mitchell
Attorney, Agent, or Firm—Cushman, Darby & Cushman

[57] ABSTRACT

Storage racking in which each bay, which is disposed back-to-back with another bay, contains a wheeled trolley which carries a standard pallet. The trolley can move to the rear of the bay against the restoring force of elastic cables to leave sufficient room at the front of the bay for another standard pallet.

5 Claims, 2 Drawing Figures

STORAGE RACKS FOR WAREHOUSES AND THE LIKE

This invention relates to storage racks which are intended for the accommodation of goods carried on pallets which are usually inserted into and withdrawn from bays of the racks by forklift trucks. In many arrangements of racking, an array of bays, a single bay deep, is disposed back-to-back with a similar array between two neighbouring aisles. Such a disposition of racks is known to be wasteful of floor space, and it has been proposed to provide arrays which are two deep, there being thereby a depth of four bays, each of which can accommodate a pallet, between each aisle. The loading and unloading of pallets from arrays which accommodate pallets two deep (that is to say one behind the other) may be satisfactory if the height of the highest bays above the ground is not great, but if the racking is high, loading and unloading can be dangerous because the insertion of forks a long way into each bay, to insert or extract the pallet in the rear part of the bay can overbalance the forklift truck. The hazard may be averted by, for example, the provision of individual trolleys for the pallets and a drive mechanism which shunts the trolleys from the mouth of a bay to a more remote location in it, but the provision of a drive for each bay is a complex and normally expensive expedient.

The present invention subsists in racking which comprises an array of pairs of bays which are disposed back-to-back and of which each bay contains a bay carrier that is movable from the front to the rear of the respective bay and is provided with a resilient bias which urges the carrier to the front of the bay and permits displacement of the trolley against the bias to the rear of the bay on insertion of a load at the front of the bay.

Such racking allows loading and unloading of pallets to and from respectively the front part of the bay, avoiding any need for a forklift truck to reach into the rear part of the bay. The first pallet to be loaded into a bay would be inserted on the carrier, which may consist of a wheeled trolley or slider that may be guided by rails running from the front to the back of the bay. The second pallet to be loaded into the bay would shunt the trolley against the resilient bias to the back of the bay. After the pallet which occupies the front of the bay has been removed, the resilient bias would return the carrier to the front of the bay ready for the removal of the pallet it carries.

The resilient bias may comprise an elastic cable, or cable having an elastic part, secured to anchorage points, which might be above and below the carrier but which are preferably on the carrier and on the racking above the carrier. Such a cable may be provided at each side of the carrier. The cable would be strained in the manner of a catapult as the carrier is urged to the rear of the bay. Alternatively, the resilient bias may be provided by a spring, such as a horizontally disposed compression spring, between the carrier and a suitable anchorage point and aligned with the carrier. The return movement of the carrier towards the front of the bay may be limited by the provision of at least one stop.

The force by which the resilient bias tends to restore the carrier to a position at the front of the bay may be sufficiently resisted merely by a frictional resistance to the movement of the outer pallet. It then would be desirable to ensure that in practice only loaded pallets were stored on the racking in the outer positions. It would be possible, particularly if the carriage were supported on rails wider than the pallets, to provide limiting stops or a locating bed which was engaged by the outer pallet, which would thereby be inhibited from outward movement under the influence of the resilient bias. However, although there is, for any particular choice of tensile force for the cable or cables a danger that particular loadings, such as very light loadings of the two pallets, may be insufficient to prevent movement of the carrier away from the rear of the bay, in practice the danger is very slight. The invention is intended for use in warehouses of large capacity. The distribution of goods in such warehouses is commonly controlled with the aid of a data processing system which is programmed to provide, for an operator of a forklift truck, instructions which prescribe the storage of heavier loads in the lower bays of the storage racking and lighter loads in the upper bays of racking. Accordingly, it is not difficult to ensure by appropriate programming of such a computer that bays are always loaded to more than a minimally safe load.

There follows a description by way of example of an embodiment of the present invention, with reference to the accompanying drawings, of which:

Figure 1:
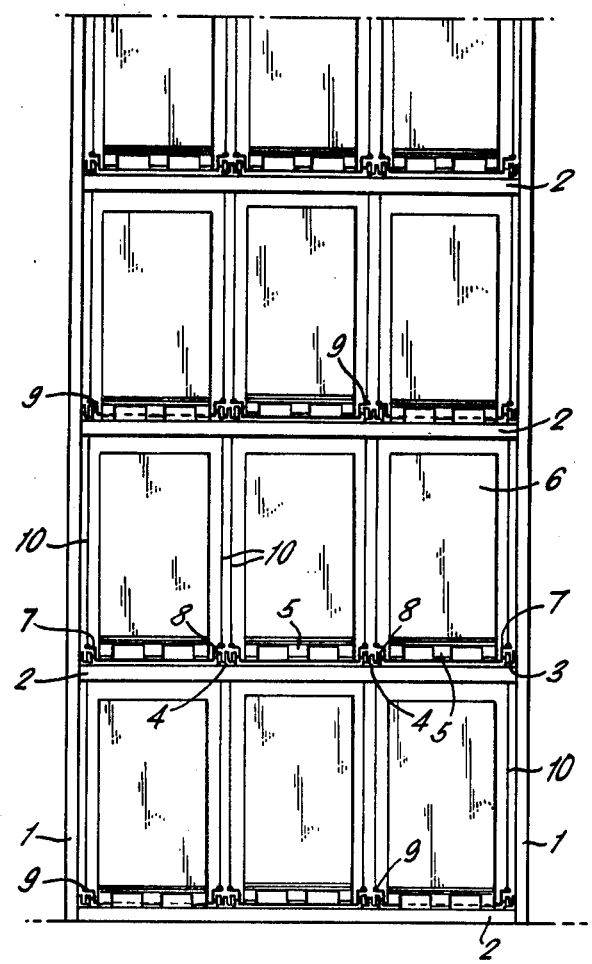
FIG. 1 is a schematic front view of racking (as seen from an aisle)
Figure 2:
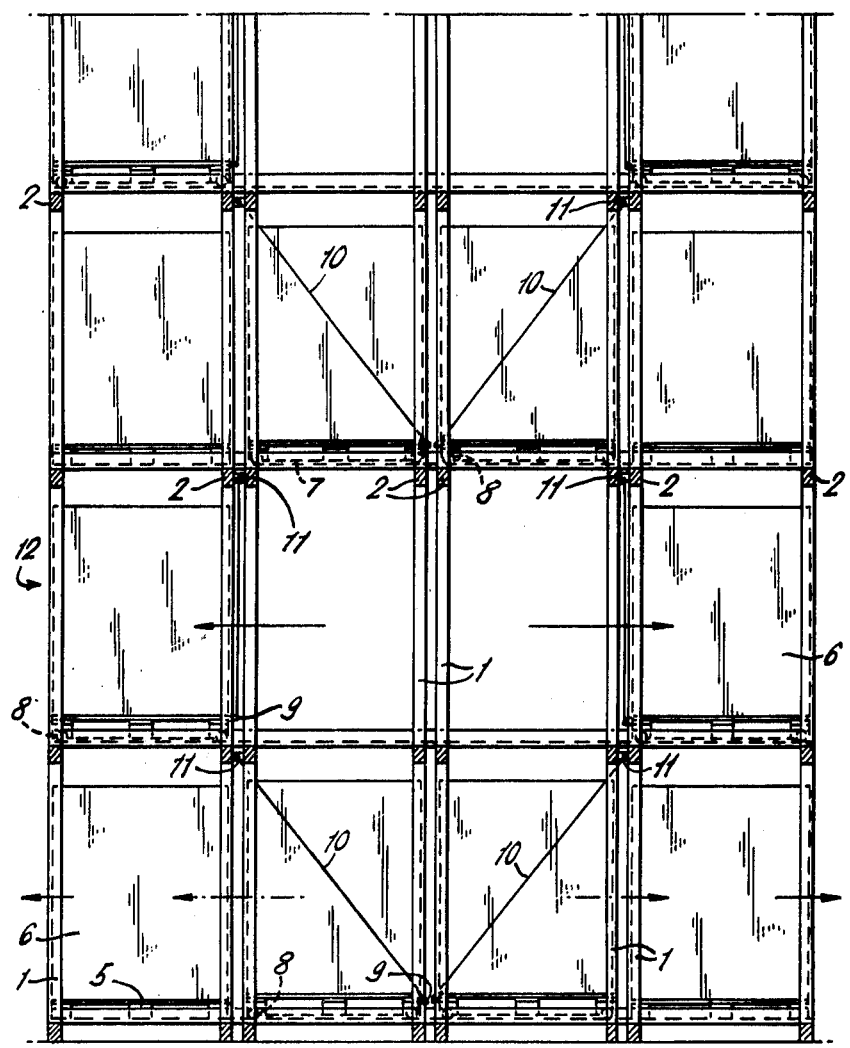
FIG. 2 is a schematic side view of racking.

In the example illustrated, the racking comprises terminal upright columns 1 and horizontal open-work floors which are constituted by beams 2 extending along the racking between corresponding columns. Except for those at the extreme side faces of the racking, the columns are grouped in pairs, a small gap being between each pair. Running across the floors, from front to back of the racking, is a plurality of rails, constituted by L-rails 3 at the ends of the stacking and inverted T-rails 4 at regular intervals along the racking. Thus each floor of the racking is in effect divided into rows. The distance between successive rails is slightly greater than the width of a standard pallet 5 whereas the length of each row, that is to say the distance between the front and back of the racking, is somewhat greater than four times the length of a standard pallet. In effect, as will be seen, there is a division of each transverse row into two double bays, disposed back-to-back. Each bay may accommodate, one behind the other, two standard pallets each carrying a package 6 or other load.

For each transverse row of the racking there are two trolleys 7 each of which may comprise, as is illustrated, a simple channel section bearing four wheels 8. The inner end of each trolley has two anchorages 9, one at each side of the trolley. From each anchorage on the trolley extends an elastic cable 10 to a respective anchorage 11 which is between two of the beams constituting one of the upper floors and is vertically above and is approximately halfway along the bay. The cable may be of rubber but it could comprise a steel hawser which incorporates a helical tension spring.

It is intended that each bay be loaded in the following manner. A first pallet is loaded by means of a forklift truck onto the trolley which, when the bay is empty, occupies the front half of the respective bay. When a second pallet is thrust into the bay, it pushes the trolley which carries the first pallet to the inner half of the bay against the force of the respective elastic cables. The second pallet is deposited on the floor of the front half of the bay. The resistance between the base of the second pallet and the floor of the bay is sufficient to counteract the tensile force of the elastic cables. When, however, the second pallet is picked up and withdrawn from the bay by a forklift truck, the trolley is moved (as shown for the bay 12) to the front of the bay by the contraction of the cables.

In order to avoid overrunning of either the front or the back of the bay by the trolley, appropriate limit stops may be provided on the rails.

I claim:

1. Storage racking comprising an array of pairs of bays which are disposed back-to-back of which each bay contains a pallet carrier that is movable from the front to the rear of the respective bay and is provided with a resilient bias which urges the carrier to the front of the bay and permits displacement of the pallet carrier against the bias to the rear of the bay on insertion of a load at the front of the bay.

2. Storage racking according to claim 1, wherein each carrier comprises a trolley and the resilient bias is constituted by at least one elastically extensible cable which is connected between the racking and the trolley.

3. Storage racking according to claim 2 in which each bay is provided with a pair of parallel rails, along which the trolley runs, the bay being such that the trolley, and a space between the rails in front of the trolley when the trolley is to the rear of the bay can each accommodate a standard pallet.

4. Storage racking according to claim 3 in which each trolley has two cables, each of which extends from a respective anchorage at the rear of the trolley to a respective anchorage above the trolley.

5. In a storage rack for storing loads on pallets: frame means forming a bay having an open front and a floor, the bay having a horizontal front-to-rear dimension appropriate to accommodate at least two pallets arranged in front-to-rear sequence; a pallet carrier disposed in the bay, said carrier having dimensions appropriate to carry a single pallet and being mounted in the bay for movement in a horizontal plane between the front and the rear of the bay; and bias means resiliently urging the carrier toward a forward position and permitting displacement of the carrier in a rearward direction on forcible insertion of a second loaded pallet through the open front end of the bay, the resistance between the base of the second pallet with the floor of the bay being sufficient to hold the carrier in a rearward position.

* * * * *